United States Patent [19]

Decker

[11] Patent Number: 5,022,903

[45] Date of Patent: Jun. 11, 1991

[54] AIR-PRECLEANER

[75] Inventor: William Decker, Cambridge, Wis.

[73] Assignee: American Farm Implement & Specialty, Inc., Janesville, Wis.

[21] Appl. No.: 425,760

[22] Filed: Oct. 23, 1989

[51] Int. Cl.$^5$ .......................................... B01D 45/00
[52] U.S. Cl. ...................................... 55/404; 55/430; 55/456
[58] Field of Search ...................... 55/385.3, 404, 430, 55/456

[56] References Cited

U.S. PATENT DOCUMENTS

| | | | |
|---|---|---|---|
| 2,193,479 | 3/1940 | Donaldson | 55/429 |
| 2,304,778 | 12/1942 | Cresswell | 55/391 |
| 2,417,130 | 3/1947 | Russell | 55/391 |
| 2,973,830 | 3/1961 | Gruener | 55/103 |
| 3,552,102 | 1/1971 | Araki | 55/449 |
| 3,670,480 | 6/1972 | Petersen | 55/430 |
| 3,740,932 | 6/1973 | Borsheim | 55/457 |
| 3,791,112 | 2/1974 | Lidstone | 55/385 |
| 3,973,937 | 8/1976 | Petersen | 55/449 |
| 4,013,137 | 3/1977 | Petersen | 55/385.3 |
| 4,135,897 | 1/1979 | Gondek | 55/404 |
| 4,138,761 | 2/1979 | Nauta | 15/353 |
| 4,197,102 | 4/1980 | Decker | 55/449 |
| 4,201,557 | 5/1980 | Petersen | 55/327 |
| 4,248,613 | 2/1981 | Linhart | 55/456 |
| 4,373,940 | 2/1983 | Petersen | 55/404 |
| 4,459,141 | 7/1984 | Burrington et al. | 55/430 |
| 4,547,207 | 10/1985 | Petersen | 55/394 |

FOREIGN PATENT DOCUMENTS

| | | | |
|---|---|---|---|
| 683986 | 6/1930 | France | 55/404 |
| 483058 | 7/1953 | Italy | 55/404 |

OTHER PUBLICATIONS

Advertisements for Best-Ex Centri Air Pre-Cleaners, Best-Ex, Inc.
Advertisement, Price List, and Specifications for Turbo ® Precleaners, by Sureco, Mar. 1, 1987.

Primary Examiner—Jay H. Woo
Assistant Examiner—C. Scott Bushey
Attorney, Agent, or Firm—Foley & Lardner

[57] ABSTRACT

An air precleaner (10) has a base assembly (12) a dome-shaped hood (18), and a rotor assembly (20). The base assembly (12) includes an inner circumferential wall (24) and an outer circumferential wall (22), the inner circumferential wall (24) defining an air outlet port (16). Angled web supports (28) connect the outer circumferential wall (22) to the inner circumferential wall (24) and their arrangement forms air inlet ports (14) that direct air upon the rotor assembly (20). The rotor assembly (20) includes a hub (64) that has arms (66) extending outward therefrom, each of the arms (66) including a first blade (68) a second blade (70) descending at right angles from the first blade (68), and a tab (72). Air incident upon the arms (6) causes rotation of the hub (64), the arms (66) flinging particulates outward. A gap (62) is formed at the interface between the base assembly (12) and the hood (18) that is positioned above the base assembly (12) and that encloses the precleaner (10). Particulates flung outward by the arms (66) are discharged through the gap (62).

28 Claims, 2 Drawing Sheets

AIR-PRECLEANER

FIELD OF THE INVENTION

This invention relates generally to devices for separating particulates from the air such as dirt, dust, rain, and snow before they enter the air stream of an engine, air compressor, or similar apparatus.

BACKGROUND OF THE INVENTION

Air precleaners are devices typically used in the removal of dust, dirt, sand, rain, snow and other air-borne particulates from the air prior to the flow of air to the carburetor of an internal combustion engine. Such precleaners promote more efficient combustion and longer engine and filter life.

The precleaners of the prior art have various configurations that are employed as a means of removing the particulates from the air. Examples of precleaners or particle separators are shown in U.S. Pat. Nos. 2,193,479; 2,304,778; 2,417,130; 2,973,830; 3,552,102; 3,670,480; 3,740,932; 3,971,112; 3,973,937; 4,138,761; 4,197,102; and 4,547,207.

Though such precleaners may adequately perform with respect to particulate removal, this is sometimes accomplished at the expense of a reduced air flow, i.e. the precleaner itself may become an air restriction. Some precleaners are usable when positioned in only one orientation.

Accordingly, a need has existed for an air precleaner that efficiently removes particulates from the air yet itself results in a minimal air restriction, and which can be mounted and functions in any position.

SUMMARY OF THE INVENTION

In accordance with the present invention, an air precleaner includes a base assembly, a dome-shaped hood, and a rotor assembly. The base assembly has an inner circumferential wall and an outer circumferential wall, the inner circumferential wall defining an air outlet port. Angled web supports connect the outer circumferential wall to the inner circumferential wall and their arrangement forms air inlet ports that direct air upon the rotor assembly. The rotor assembly includes a hub having a plurality of arms extending therefrom that rotates upon an axle when struck by air entering through the air inlet ports. An even gap extends substantially about a 360° interface between the base assembly and the hood, the gap serving as a discharge port for particulate matter.

In the operation of the air precleaner of the present invention, air to be cleaned is drawn through the air inlet ports and directed toward the rotor assembly. Air incident upon the arms of the rotor assembly causes rotation of the rotor assembly, so that particulate matter is flung toward the hood. The hood being dome-shaped, the particulates are forced down the surface of the hood and discharged through the gap. Cleaned air is then drawn through the air outlet port by, for example, the vacuum effect of an engine.

The configuration of the present invention to include features such as a dome-shaped hood reduces air restriction of the air entering and exiting the precleaner. For the case of use with internal combustion engines, the result of a reduced air restriction is a more complete and efficient combustion of the fuel. The present invention has less than half the air restriction as measured in inches of water as compared with air precleaners of the prior art using spiner-type rotors. The increased efficiency of the precleaner of the present invention is particularly advantageous in high altitude applications. The present invention can be mounted and functions in any position.

Further objects, features, and advantages of the invention will be apparent from the following detailed description taken in conjunction with the accompanying drawings.

DESCRIPTION OF THE PREFERRED EMBODIMENT

Figure 1:
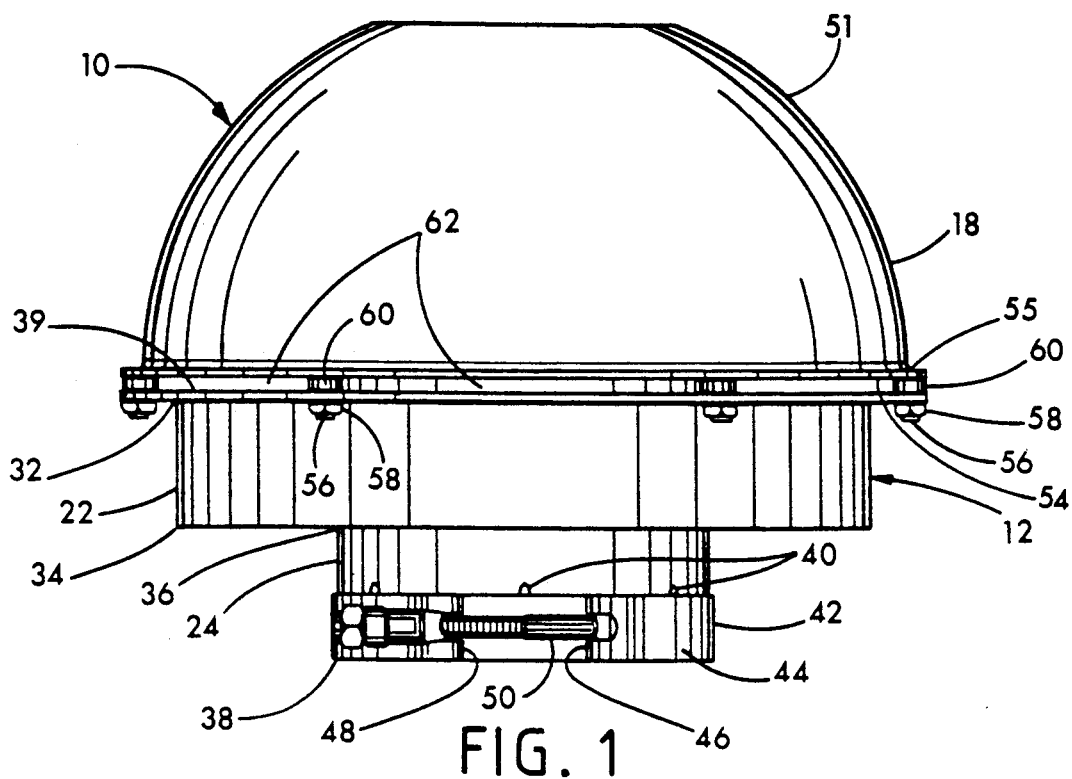
FIG. 1 is a side view of the air precleaner of the present invention.
Figure 2:
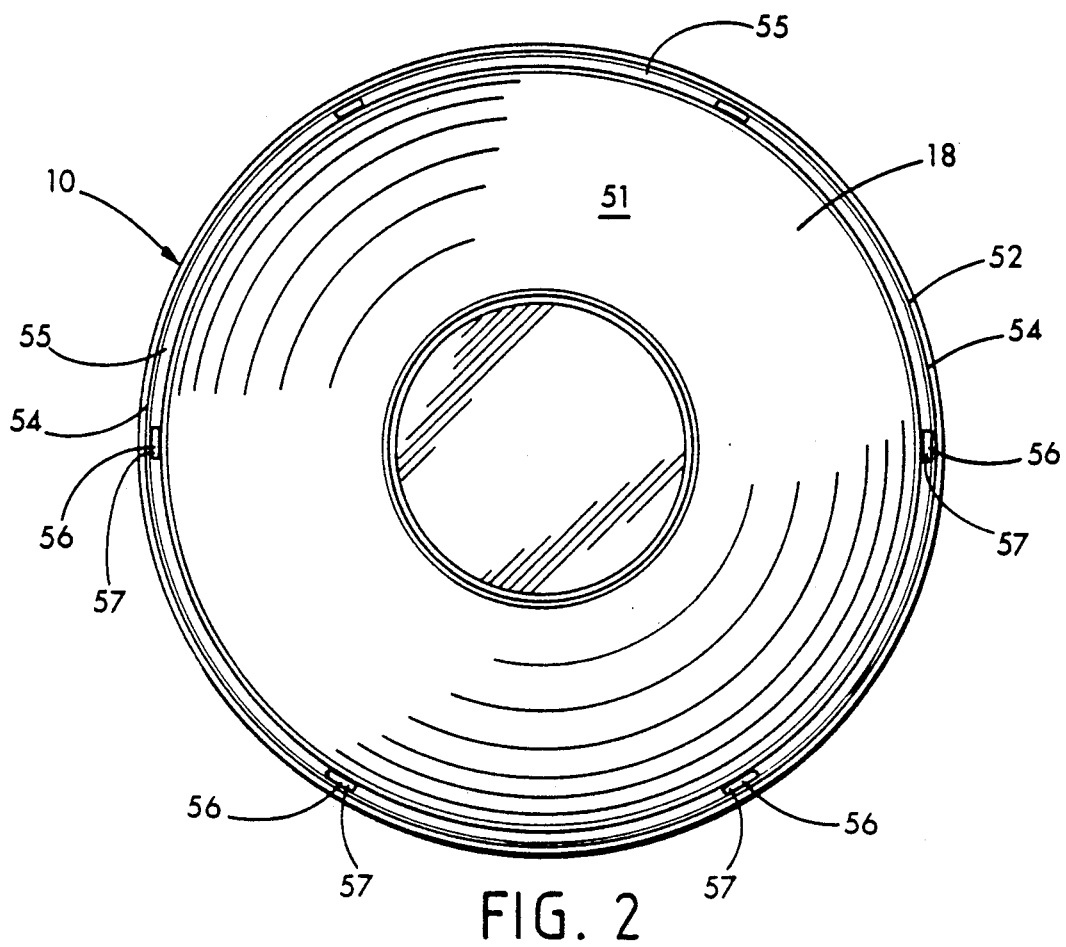
FIG. 2 is a top view of the air precleaner of the present invention.

With reference to the drawings, FIGS. 1-4 show various views of the air precleaner of the present invention at 10. The air precleaner 10 comprises a base assembly 12 having air inlet ports 14 and an air outlet port 16, a dome-shaped hood 18 positioned above the base assembly 12, and a rotor assembly 20 that is rotatably mounted on the interior of the precleaner 10. The precleaner 10 is a device used for separating particulates from a carrier fluid. Where the carrier fluid is air, exemplary particulates include dust, dirt, sand, rain, snow, or any other air-borne particle matter.

Figure 3:
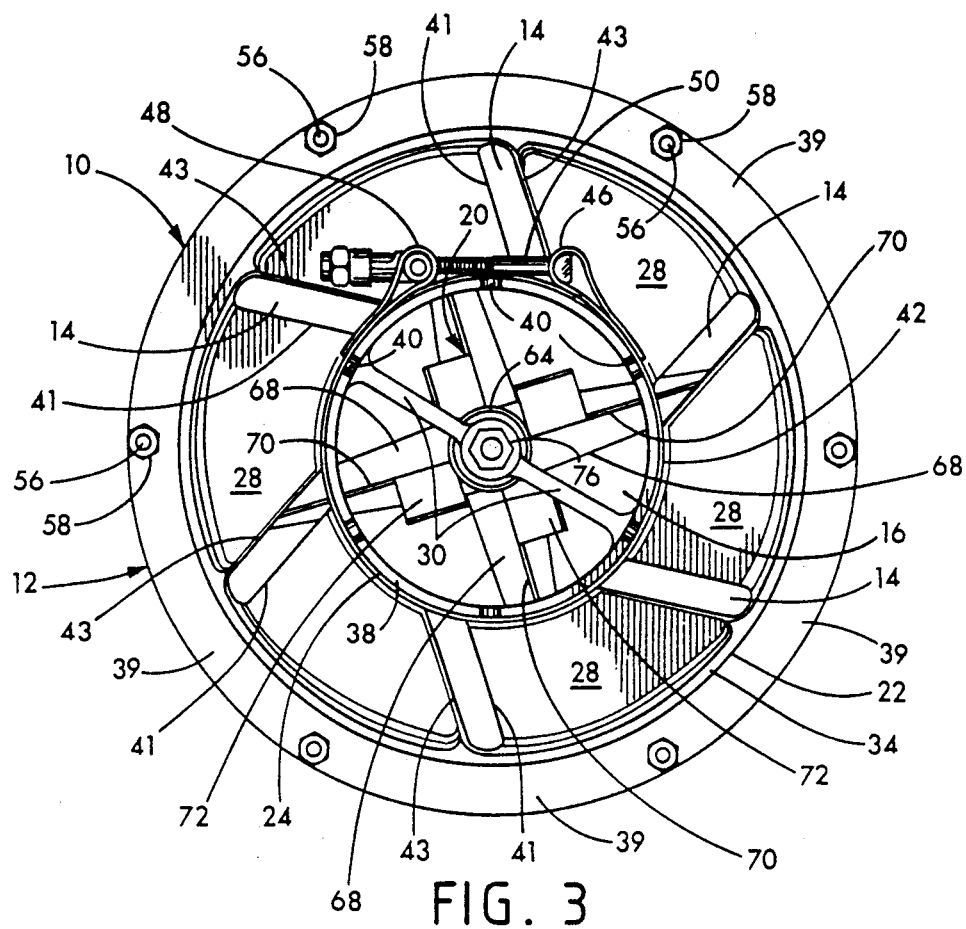
FIG. 3 is a bottom view of the air precleaner of the present invention.
Figure 4:
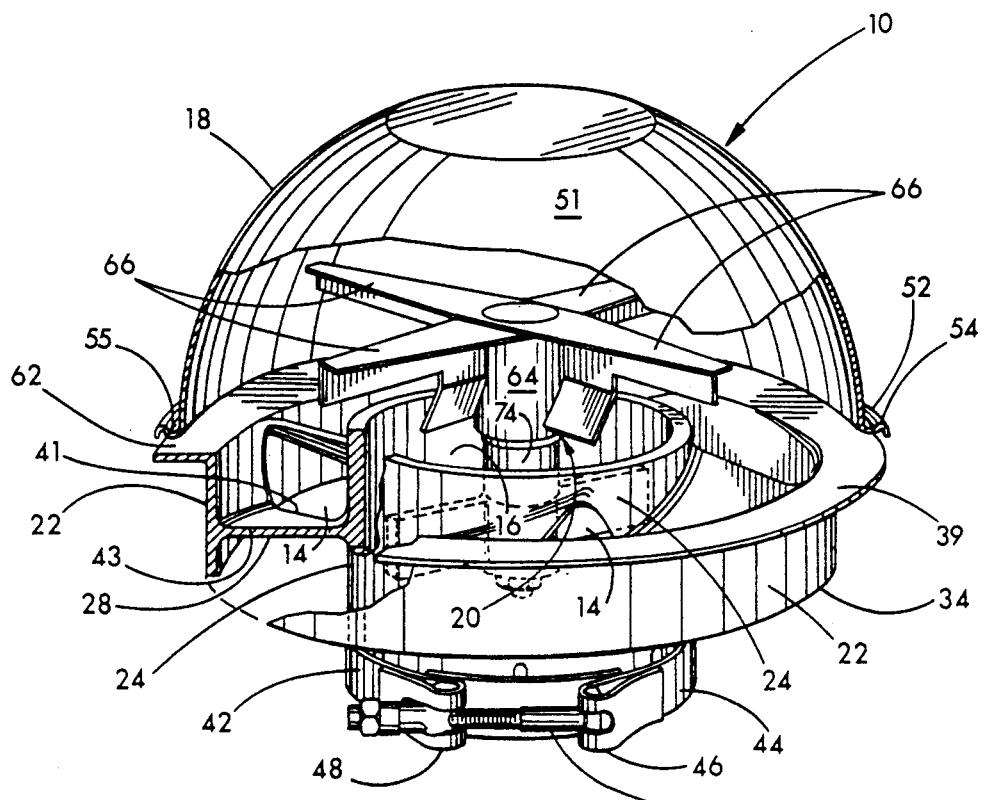
FIG. 4 is a perspective view of the air precleaner of the present invention with portions of the hood and base assembly of the precleaner being cut away to show internal parts of the precleaner.

The base assembly 12 is cast or formed in a single piece to include an outer circumferential wall 22, an inner circumferential wall 24, a plurality of a web segments 28, and a strut 30. According to the orientation as is shown in the figures, the outer circumferential wall 22 has a top 32 and a bottom 34; the inner circumferential wall 24 has a top 36 and a bottom 38. A peripheral ledge 39 is welded to the top 32 of the outer circumferential wall 22. The web segments 28 connect the outer circumferential wall 22 to the inner circumferential wall 24. The web supports 28 connect the outer circumferential wall 22 to the inner circumferential wall 24 and, by their arrangement between the outer and inner circumferential walls 22 and 24, form the air inlet ports 14 that allow fluid communication from the exterior of the precleaner 10 to the interior of the precleaner 10. In the orientation such as is shown in FIG. 4, each of the web supports 28 are angled from a low first edge 41 to a high second edge 43, the second edge 43 being located counterclockwise from the first edge 41. The web supports 28 are thus successively arranged in counterclockwise fashion in the area formed between the outer circumferential wall 22 and the inner circumferential wall 24. Each of the air inlet ports 14 are formed and bounded by the second edge 43 of one web support 28 and the first edge 41 of the succeeding counterclockwise web support 28. The air inlet ports 14 are also bounded by the outer circumferential wall 22 and the inner circumferential wall 24. There are six air inlet ports 14 in the precleaner 10 as depicted in FIG. 3, though other numbers are possible. The ports 14 are angled so that fluid is drawn in from the exterior of the precleaner 10 and directed at the rotor assembly 20, in a manner described below.

The inner circumferential wall 24 defines the air outlet port 16, the bottom 38 of the inner circumferential wall 24 extending below the bottom 34 of the outer circumferential wall 22. The outlet port 16, as defined by the inner circumferential wall 24, is typically serially connected and fitted to the air intake of an engine, air compressor, or similar apparatus, so that the precleaner 10 acts to preclean the air prior to its entry into the apparatus. The operation of the precleaner 10 will be described in further detail below. The inner circumferential wall 24 has longitudinal slots 40 that extend upward from the bottom 38 of the inner circumferential wall 24 in order that the inner circumferential wall 24 may be more easily fitted over the top of the air intake of the engine, air compressor, or similar apparatus. A C-clamp 42 having a band 44 terminating in a first end 46 and a second end 48, and further including a screw 50 threaded through the first and second ends 46 and 48, is positioned so that the band 44 wraps circumferentially about the inner circumferential wall 24 in the region of the longitudinal slots 40 so that when the screw 50 is tightened to draw the first and second ends 46 and 48 together, the inner circumferential wall 24 is tightly secured about the air intake of the engine, air compressor, or similar apparatus. The outlet port 16 of the precleaner 10 is therefore in fluid communication with the air intake of the engine, air compressor, or similar apparatus. The strut 30 extends diametrically across the outlet port 16 upon which the rotor assembly 20 is mounted.

The hood 18 has a dome-shaped surface 51, terminating at a peripheral edge 52. "Dome-shaped," as used herein, is defined to mean a shape that is hemispherical, convex, shaped like an inverted bowl, or to have portions that are represented by sections that are substantially hemispherical, convex, or shaped like an inverted bowl. The hood 18 defines an air space above the base assembly 12 so that the air space and the inlet and outlet ports 14 and 16 are in fluid communication. The peripheral edge 52 is rolled to form a lip 54 and a circumferential channel 55 between the lip 54 and the dome-shaped surface 51. The hood 18 is attached to the base assembly 12 by bolts 56 that extend through the peripheral edge 52 and the ledge 39 of the base assembly 12, the bolts 56 each having heads 57 at one end that fit within the channel 55 to prevent rotation of the bolts 56. The bolts 56 are secured by nuts 58 at the end of the bolts 56 opposite the heads 57. Spacers 60 are positioned about the bolts 56 between the ledge 39 of the base assembly 12 and the peripheral edge 52 of the hood 18. Each of the spacers 60 are of equal thickness so as to create an even gap 62 between the base assembly 12 and the hood 18. The gap 62 therefore extends substantially about the 360° interface between the base assembly 12 and the hood 18, except in the small amount of area occupied by the spacers 60. As explained in greater detail below, the gap 62 serves as a discharge port for the particulates that are removed from the carrier fluid.

The rotor assembly 20 is best shown in FIGS. 3 and 4. The rotor assembly 20 comprises a machined hub 64 with four arms 66 extending radially therefrom, the arms 66 being equidistant from each other to form an "X"-type configuration. Each of the arms 66 has a first blade 68 and a second blade 70, the second blade 70 descending at right angles from the first blade 68. The first blades 68 are in a plane radial to the hub 64; the second blades 70 are in four separate planes axial to the hub 64. The second blade 70 of each of the arms 66 also has an integrally formed tab 72 that extends downward from the blade 70 in a manner as depicted in FIG. 4. The tabs 72 are located proximate the hub 64 and are slightly bent or flared in a clockwise direction. It may be desirable, and is considered within the scope of the present invention, for the length of the tabs 72 to be selected for different applications. The tabs 72 are sized to vary the speed of the rotor assembly 20, which correspondingly affects the efficiency of the precleaner 10 for different altitudes of operation. In higher altitude applications, for example, longer tabs 72 are preferable. The hub 64 is mounted upon a precision ground axle 74 by two highly ground precision shielded bearings (not shown). The axle 74 is threaded at one end and is attached to the strut 30 that extends diametrically across the outlet port 16 by a nut 76.

In the operation of the precleaner 10, air that may contain particulate matter is typically drawn into the precleaner 10 by vacuum pressure caused by an engine or similar device mounted below the air outlet port 16 of the precleaner 10. The air is thus drawn through the air inlet ports 14, the angling of the web supports 28 directing the air flow in a circular, counterclockwise direction within the precleaner 10. The air flow is directed against the blades 68 and 70, and the tabs 72, of the rotor assembly 20, thus causing the rotor assembly 20 to spin in a counterclockwise direction. The circular motion of the rotor assembly 20 causes a centrifugal force to be exerted on particulates that are within the air that has been drawn into the precleaner 10. The particulates are thus flung outward, either through the gap 62 or against the hood 18. The domed-shape configuration of the hood 18 forces particulates down the interior of the domed surface 51 for discharge through the gap 62. Cleaned air is then drawn by the vacuum effect of the engine through the air outlet port 16 into the intake of an engine or similar apparatus.

The above-described precleaner of the present invention is an effective means of precleaning air that is to be introduced into an engine, air compressor, or similar apparatus, and is efficient even at high altitudes. It is to be understood that the precleaner 10 of the present invention is not limited merely to applications within air and to those applications that remove particulates that are typically contained within air. The precleaner 10 will work in applications involving other fluids as well. Though the figures and the corresponding text have, for example, assigned a "top" a "bottom," and corresponding identifying labels to the precleaner 10, these have been used for illustrative purposes inasmuch as the air precleaner 10 can be mounted and will function in any position. Further, though the air inlet ports 14 and the rotor assembly 20 have been depicted to cause air flow and rotation of the rotor assembly 20 in a counterclockwise direction, a precleaner with air flow and rotation of the rotor assembly in a clockwise direction is considered within the scope of the present invention.

It is further understood that the invention is not confined to the particular construction and arrangement of parts herein illustrated and described, but embraces such modified forms thereof as come within the scope of the following claims.

What is claimed is:

1. An air precleaner that separates particulates from air, comprising:

(a) a base assembly having an inlet port through which air enters the precleaner and an outlet port through which air exits the precleaner;

(b) a hood that defines an air space above the base assembly so that the air space and the inlet and outlet ports are in fluid communication, the hood positioned above the base assembly so as to form a gap that extends substantially along the interface of the base assembly and the hood; and (c) a rotor assembly that is rotatably mounted within the air space that is defined by the hood and that rotates when air enters through the inlet port to fling particulates outward for expulsion through the gap, wherein the rotor assembly further includes:

an axle mounted to the base assembly, a hub that is rotatably mounted upon the axle, and an arm that is attached to the hub in the path of air entering through the inlet port, the air causing the hub to rotate upon the axle and the arm to fling particulates outward, wherein the arm includes a first blade that is mounted to the arm in a plane radial to the hub and a second blade that descends at right angles to the first blade in a plane axial to the hub, and wherein the second blade further includes a tab that extends downward from the second blade proximate the hub.

2. The air precleaner of claim 1 wherein the hood is dome-shaped.

3. The air precleaner of claim 1 wherein the gap is formed by spacers positioned between the base assembly and the hood.

4. The air precleaner of claim 1 wherein there are a plurality of air inlet ports.

5. The air precleaner of claim 4 wherein the base assembly comprises:

(a) an inner circumferential wall that defines the outlet port; and (b) an outer circumferential wall that is connected to the inner circumferential wall by web supports, the inlet ports being defined between web supports and the web supports being angled to direct air upon the rotor assembly to cause the rotor assembly to rotate.

6. The air precleaner of claim 5 wherein the inner circumferential wall has a strut that extends diametrically across the outlet port upon which the rotor assembly is mounted.

7. The air precleaner of claim 1 wherein the tab is bent in a direction against the rotation of the rotor assembly.

8. The air precleaner of claim 1 wherein there are four arms attached to the hub, each of the arms being equidistant from each other.

9. An air precleaner that separates particulates from air, comprising:

(a) an inner circumferential wall that defines an outlet port through which cleaned air exits the precleaner;

(b) an outer circumferential wall that is connected to the inner circumferential wall by web supports, inlet ports through which air enters the precleaner being defined between the web supports and the web supports being angled to direct air;

(c) a ledge that is attached to the periphery of the outer circumferential wall;

(d) a hood that defines an air space, the hood being spaced apart from the ledge to create a circumferential gap between the ledge and the hood that serves as a discharge port for the particulates; and (e) a rotor assembly that is rotatably mounted within the air space that is defined by the hood and that is positioned in the path of air being directed through the inlet ports, the rotor assembly rotating when air enters through the inlet port to fling particulates outward for expulsion through the circumferential gap.

10. The air precleaner of claim 9 wherein the hood is dome-shaped.

11. The air precleaner of claim 9 wherein the gap is formed by spacers positioned between the ledge and the hood.

12. The air precleaner of claim 9 wherein the inner circumferential wall has a strut that extends diametrically across the outlet port upon which the rotor assembly is mounted.

13. The air precleaner of claim 12 wherein the rotor assembly further includes:

(a) an axle;

(b) a hub that is rotatably mounted upon the axle; and (c) an arm that is attached to the hub in the path of air entering through the inlet ports, the air causing the hub to rotate upon the axle and the arm to fling particles outward.

14. The air precleaner of claim 13 wherein the arm includes a first blade that is mounted to the arm in a plane radial to the hub and a second blade that descends at right angles to the first blade in a plane axial to the hub.

15. The air precleaner of claim 14 wherein the second blade further includes a tab that extends downward from the second blade proximate the hub.

16. The air precleaner of claim 15 wherein the tab is bent in a direction against the rotation of the rotor assembly.

17. The air precleaner of claim 13 wherein there are four arms attached to the hub, each of the arms being equidistant from each other.

18. An air precleaner that separates particulates from air, comprising:

(a) a base assembly having an inlet port through which air enters the precleaner and an outlet port through which cleaned air exits the precleaner;

(b) a dome-shaped hood that defines an air space above the base assembly so that the air space and the inlet and outlet ports are in fluid communication, the hood positioned and supported above the base assembly by spacers so as to form a gap that extends substantially along the interface of the base assembly and the hood around the entire circumference of the hood and the base assembly;

(c) an axle mounted to the base assembly;

(d) a hub that is rotatably mounted upon the axle; and (e) an arm that is attached to the hub in the path of air entering through the inlet port, the air causing the hub to rotate about the axle and the arm to fling particulates outward for expulsion through the gap.

19. The air precleaner of claim 18 wherein there are a plurality of inlet ports.

20. The air precleaner of claim 18 wherein the base assembly comprises:

(a) an inner circumferential wall that defines the outlet port; and (b) an outer circumferential wall that is connected to the inner circumferential wall by web supports, the inlet ports being defined between web supports and the web supports being angled to direct air upon the rotor assembly to cause the hub to rotate.

21. The air precleaner of claim 20 wherein the inner circumferential wall has a strut that extends diametrically across the outlet port upon which the axle is mounted.

22. An air precleaner that separates particulates from air, comprising:
    (a) a base assembly having an inlet port through which air enters the precleaner and an outlet port through which air exits the precleaner;
    (b) a dome-shaped hood that defines an air space above the base assembly so that the air space and the inlet and outlet ports are in fluid communication, the hood positioned above the base assembly so as to form a gap that extends substantially along the interface of the base assembly and the hood; and
    (c) a rotor assembly that is rotatably mounted within the air space that is defined by the dome-shaped hood and that rotates when air enters through the inlet port to fling particulates outward for expulsion through the gap,
    an axle mounted to the base assembly,
    a hub that is rotatably mounted upon the axle, and
    an arm that is attached to the hub in the path of the air entering through the inlet port, the air causing the hub to rotate upon the axle and the arm to fling particulates outward, wherein the arm includes a first blade that is mounted to the arm in a plane radial to the hub and a second blade that descends at right angles to the first blade in a plane axial to the hub, and wherein the second blade further includes a tab that extends downward from the second blade proximate the hub.

23. The air precleaner of claim 22 wherein the gap is formed by spacers positioned between the base assembly and the dome-shaped hood.

24. The air precleaner of claim 22 wherein there are a plurality of air inlet ports.

25. The air precleaner of claim 24 wherein the base assembly comprises:
    (a) an inner circumferential wall that defines the outlet port; and
    (b) an outer circumferential wall that is connected to the inner circumferential wall by web supports, the inlet ports being defined between web supports and the web supports being angled to direct air upon the rotor assembly to cause the rotor assembly to rotate.

26. The air precleaner of claim 25 wherein the inner circumferential wall has a strut that extends diametrically across the outlet port upon which the rotor assembly is mounted.

27. The air precleaner of claim 22 wherein the second blade further includes a tab that extends downward from the second blade proximate the hub.

28. The air precleaner of claim 22 wherein there are four arms attached to the hub, each of the arms being equidistant from each other.

* * * * *